United States Patent

[11] 3,575,440

| [72] | Inventor | Ralph B. Lay<br>Columbus, Ind. |
|---|---|---|
| [21] | Appl. No. | 858,359 |
| [22] | Filed | Sept. 16, 1969<br>Division of Ser. No. 733,174,<br>May 29, 1968. |
| [45] | Patented | Apr. 20, 1971 |
| [73] | Assignee | Hamilton Cosco Inc.<br>Columbus, Ind. |

[54] SERVING CART
3 Claims, 6 Drawing Figs.

| [52] | U.S. Cl. | 280/79.3 |
|---|---|---|
| [51] | Int. Cl. | B62b 5/00 |
| [50] | Field of Search | 280/79.2, 79.3; 49/411; 160/381; 287/189.36 (H) |

[56] References Cited
UNITED STATES PATENTS

| 1,171,486 | 2/1916 | Warner | 280/79.3 |
| 1,722,947 | 7/1929 | Schneider et al. | 160/381 |
| 1,765,388 | 6/1930 | Watson | 160/381 |
| 2,004,727 | 6/1935 | Keller | 160/381 |

*Primary Examiner*—Kenneth H. Betts
*Assistant Examiner*—Rorbert R. Song
*Attorney*—Trask, Jenkins and Hanley ABSTRACT: A serving cart in which there is a pair of end frames each formed from a pair of wheeled uprights interconnected at their upper and lower ends by upper and lower transverse stretches. A shelf is interconnected to said end frames and has a peripheral molding attached thereto and extending therearound. Corner brackets underlie said shelf and are connected to said molding and to end braces which also underlie said shelf in abutting relation to said brackets and molding. Fastening elements extend through aligned openings in the brackets, end braces, and molding for reception in said uprights to connect said shelf to said uprights.

Patented April 20, 1971

INVENTOR
RALPH B. LAY
BY
Trask, Jenkins & Hanly
ATTORNEYS

Patented April 20, 1971

INVENTOR
RALPH B. LAY
BY

ATTORNEYS

SERVING CART

This application is a divisional application of my copending application Ser. No. 733,174, filed May 29, 1968.

BACKGROUND OF THE INVENTION

Serving carts are known in the art, but the serving carts heretofore available have employed frame structures formed from members which are bent into the desired configurations during manufacture thereby increasing the cost of manufacture and making them bulky to ship in knocked-down condition. Further, such carts have required rather complicated assembly operations in which many of the fastening members for interconnecting the various cart components are disposed in positions such that they detract from the overall appearance of the cart.

It is an object of this invention to provide an improved serving cart construction which will overcome these difficulties and disadvantages.

SUMMARY OF THE INVENTION

In accordance with one form of the invention, there is provided a serving cart comprising a pair of end frames interconnected by one or more shelves. Each of the end frames is formed from metal tubing and comprises a pair of uprights interconnected at their upper and lower ends by transverse stretches. The adjacent ends of said stretches and uprights are interconnected by L-shaped connectors lockingly retained in the adjacent ends of said uprights and stretches. The connectors at the lower ends of said uprights have openings formed therein in alignment with openings formed in said lower stretches for the reception of the spindles on a plurality of ground-engageable casters.

A peripheral molding extends around said shelf and is provided with opposed end sections interconnected by a vertically extending intermediate section with the end sections abutting the upper and lower faces of the shelf and the intermediate section abutting the inner faces of the end frame uprights. Generally L-shaped brackets underlie the shelf at the corners thereof and are connected to said intermediate section. End braces also underlie said shelf at the ends thereof in abutting engagement with said brackets and intermediate section, and a plurality of bolts extend through aligned openings in said brackets, end braces, and intermediate molding section for reception in nuts in said uprights to connect said shelf to said uprights.

DESCRIPTION OF THE DRAWINGS

The accompanying drawings illustrate the invention. In such drawings.

DETAILED DESCRIPTION OF THE PREFERRED EMBODIMENT

Figures 1, 2, 3:
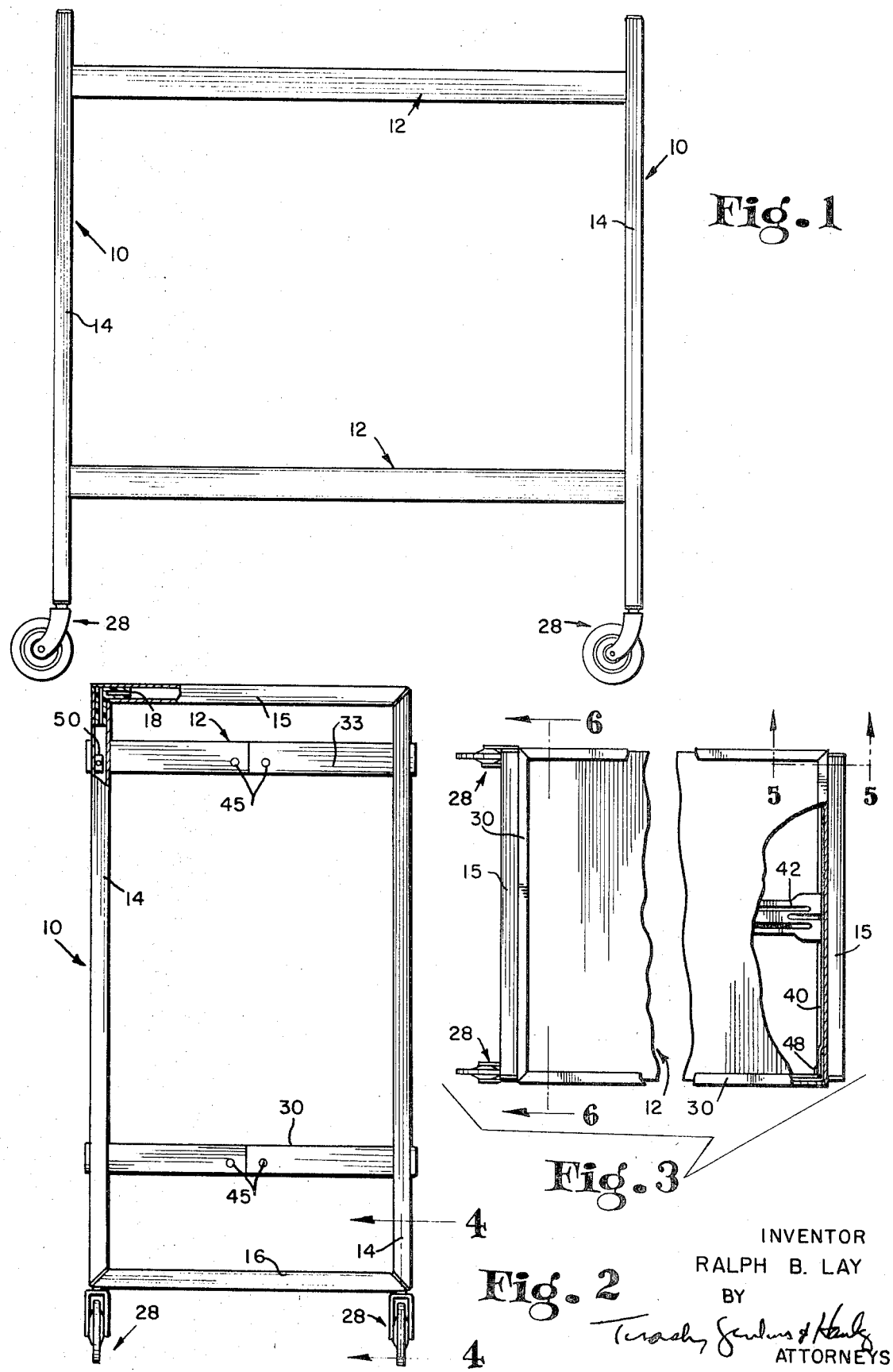
FIG. 1 is a side elevation of a serving cart embodying the invention.
FIG. 2 is an end elevation of the cart shown in FIG. 1.
FIG. 3 is a plan view of the cart shown in FIG. 1 but with portions thereof being broken away.

As shown in the drawings, the invention comprises a serving cart formed from a pair of end frames 10 interconnected by a pair of vertically spaced shelves 12.

Figure 4:
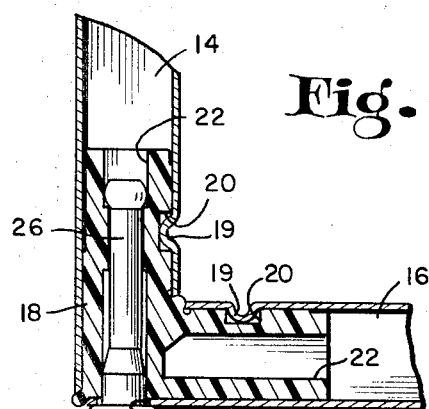
FIG. 4 is an enlarged vertical section taken on the line 4—4 of FIG. 1.

The end frames are formed from lengths of metal tubing, and are identical in construction. Each of said frames comprises a pair of uprights 14 interconnected at their upper and lower ends by upper and lower transverse stretches 15 and 16, the stretches 15 serving as push handles for the cart. The adjacent ends of the uprights 14 and the stretches 15 and 16 are mitered, and as shown in FIG. 4, are interconnected by generally L-shaped connectors 18 received therein. To this end, recesses 20 are formed in the connectors 18 slightly inwardly from their ends, and after insertion of the connectors into the ends of the uprights and transverse stretches, portions of the uprights 14 and stretches 15 and 16 are deformed inwardly to form offsets 19 received in the recesses 20 to thus lockingly retain the connectors in said stretches and uprights.

As shown in FIG. 4, each leg of each connector is provided with an elongated centrally disposed opening 22. The openings 22 in the connector legs received in the uprights 14 are disposed in alignment with openings 24 in the bottom of the transverse stretches 16 at the ends thereof. This permits the spindle 26 of a caster 28 to be bindingly received in each of the connectors at the lower ends of the uprights 14 for mounting said casters on the end frames.

Figure 5:
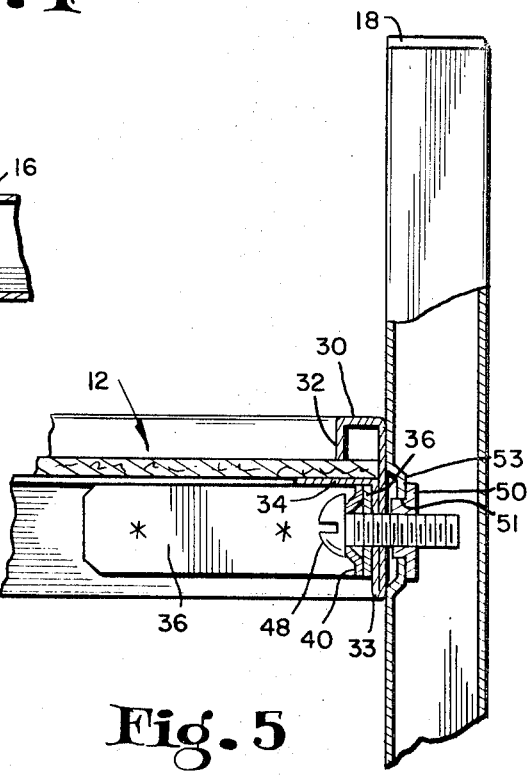
FIG. 5 is an enlarged vertical section taken on the line 5—5 of FIG. 1.
Figure 6:
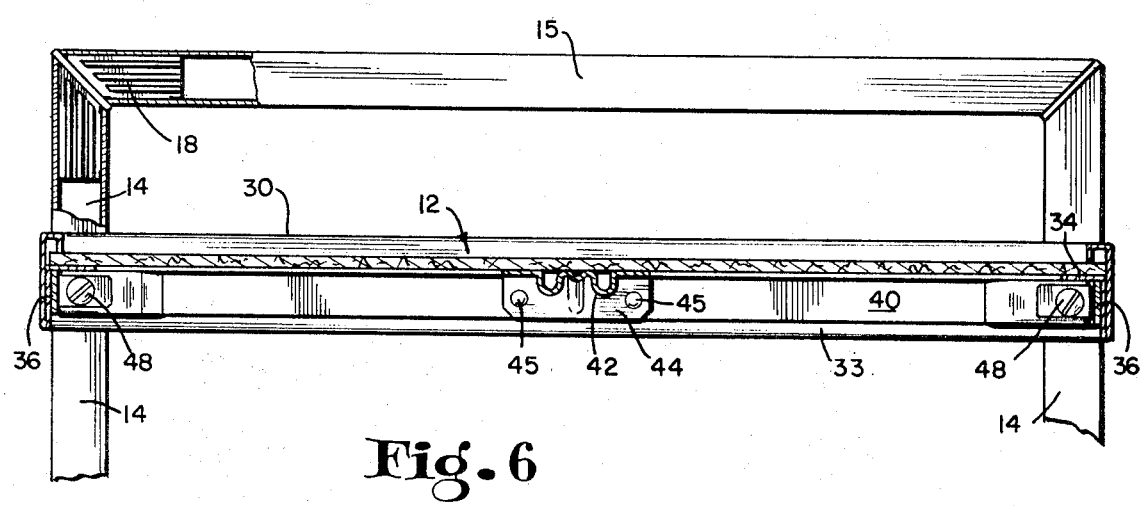
FIG. 6 is an enlarged fragmentary vertical section taken on the line 6—6 of FIG. 3.

The shelves 12 interconnecting the end frames 10 are identical in construction. As shown in FIG. 5, a peripheral molding 30 extends around the shelf, and comprises a downwardly bent channeled upper end section 32 bearing against the upper face of the shelf. The end section 32 is continuous with a vertically extending intermediate section 33 projecting downwardly below said shelf and folded inwardly and upwardly against itself. The inner upper end of the intermediate section 33 terminates in an inwardly projecting end section 34 bearing against the lower face of the shelf 12. Thus, said shelf is bindingly retained between the molding end sections 32 and 34.

An L-shaped corner bracket 36 is fixedly connected to the inner face of the molding section 33 at each corner of the shelf to stiffen the shelf at the corners thereof. The shelf is further strengthened in a lateral direction by end braces 40 disposed at each of its ends with their intermediate portions abutting the inner face of the intermediate molding section 33 and their ends abutting the inwardly presented faces of the corner brackets 36. The shelf is strengthened longitudinally by an elongated center brace 42 extending longitudinally of the shelf in engagement with the lower face thereof. At each of its ends, the brace 42 is provided with a down-turned flange 44 abutting the inner face of the adjacent end brace 40 and connected to said end brace and intermediate molding section 33 by rivets 45.

As shown in FIG. 5, the shelf assembly is connected to the uprights 14 by a plurality of bolts 48 extending through aligned openings formed in the corner brackets 36, end braces 40, and intermediate molding section 33. Said bolts are received in nuts 50 fixedly mounted in openings 51 in the inner faces of the uprights 14. As shown, the openings 51 are formed in recesses 53 in the inner faces of said uprights. The intermediate molding section 33 has a vertical extent greater than the vertical extent of the recesses 53 so that as the bolts 48 are tightened into the nuts 50 the outer face of the molding section 33 will be disposed in abutting engagement with the inner faces of the uprights 14. Thus, the bolts 48 are disposed in positions where they will be hidden from view and will not detract from the appearance of the cart.

While the cart has been described as employing a pair of shelves 12, it is to be understood, of course, that any number of such shelves may be employed which can be connected to the end frames in the manner described.

I claim:

1. A serving cart, comprising a pair of end frames formed from metal tubing and each including a pair of uprights interconnected at their upper and lower ends by upper and lower transverse stretches, locking means for lockingly connecting the adjacent ends of said uprights and transverse stretches, said locking means comprising L-shaped connectors lockingly retained in the adjacent ends of said uprights and stretches, the connectors at the lower ends of said uprights having openings formed therein in alignment with openings formed in said lower stretches for the reception of the spindles on a plurality of casters, and at least one shelf connected at its opposed ends to said end frames.

2. A serving cart as set forth in claim 1 in which the adjacent ends of said uprights and transverse stretches have offsets formed therein, and said connectors are provided with recesses inwardly from their ends for the reception of said offsets.

3. A serving cart, comprising a pair of end frames formed from metal tubing and each including a pair of uprights interconnected at their upper and lower ends by upper and lower transverse stretches, locking means lockingly connecting the adjacent ends of said uprights and transverse stretches, said locking means comprising L-shaped connectors lockingly retained in the adjacent ends of said uprights and stretches, the connectors at the lower ends of said uprights having openings formed therein in alignment with openings formed in said lower stretches for the reception of the spindles on a plurality of casters, a generally rectangular shelf interconnected to said uprights, a peripheral molding extending around said shelf and having opposed end sections engaging the upper and lower faces of said shelf and interconnected by a vertically extending intermediate section abutting said uprights, generally L-shaped brackets underlying said shelf at the corners thereof and connected to said intermediate section, end braces underlying said shelf at the ends thereof and abutting said brackets and intermediate section, and fastening elements extending through aligned openings in said brackets, end braces, and intermediate section for reception in said uprights to connect said shelf to said uprights.